United States Patent [19]
Ishikawa et al.

[11] Patent Number: 5,501,883
[45] Date of Patent: Mar. 26, 1996

[54] MATERIAL FOR USE AS A TRANSPARENT CONDUCTIVE FILM AND METHOD FOR MAKING A TRANSPARENT CONDUCTIVE FILM USING THE MATERIAL

[75] Inventors: Takao Ishikawa; Tomoji Oishi; Sachiko Maekawa, all of Hitachi, Japan

[73] Assignee: Hitachi, Ltd., Tokyo, Japan

[21] Appl. No.: 281,029

[22] Filed: Jul. 27, 1994

[30] Foreign Application Priority Data

Sep. 7, 1993 [JP] Japan .................................. 5-221874

[51] Int. Cl.$^6$ ............................................. C09K 19/00
[52] U.S. Cl. ...................... 428/1; 204/290 R; 204/290 F; 204/291; 428/688; 428/689; 428/697; 428/702
[58] Field of Search ........................... 428/1, 689, 688, 428/697, 702; 204/96, 291, 290 R, 290 F

[56] References Cited

U.S. PATENT DOCUMENTS

| | | | |
|---|---|---|---|
| 3,893,897 | 7/1975 | Raetzsch | 204/98 |
| 3,950,240 | 4/1976 | Cookfair | 204/290 F |
| 4,626,334 | 12/1986 | Ohe | 204/290 R |
| 4,651,126 | 3/1987 | Kumar | 338/309 |

FOREIGN PATENT DOCUMENTS

| | | |
|---|---|---|
| 8176806 | 10/1983 | Japan . |
| 0220505 | 11/1985 | Japan . |
| 0220506 | 11/1985 | Japan . |
| 2216108 | 9/1987 | Japan . |

*Primary Examiner*—Nasser Ahmad
*Attorney, Agent, or Firm*—Antonelli, Terry, Stout & Kraus

[57] ABSTRACT

A material for use as a transparent conductive film contains tin oxide to which antimony is added, an oxide of at least one metal of Group VIII except for Fe, Co and Ni, and an organic solvent. The transparent conductive film has good characteristics for use as a transparent electrode for liquid crystal display devices and as an antistatic film on the display surface of Braun tubes.

1 Claim, 2 Drawing Sheets

MATERIAL FOR USE AS A TRANSPARENT CONDUCTIVE FILM AND METHOD FOR MAKING A TRANSPARENT CONDUCTIVE FILM USING THE MATERIAL

BACKGROUND OF THE INVENTION

This invention relates to a material for use as a transparent conductive film comprised mainly of tin oxide, a method for making a transparent conductive film using the same, and the use thereof.

As a material for transparent conductive film, there are known ITO (indium tin oxide), ATO (antimony tin oxide) and the like. These materials are employed as a transparent electrode for liquid crystal display devices, an electrode for solar cells, and an antistatic film for Braun tubes.

As electronic devices are progressing in performance, there is a demand of a transparent conductive film being low in resistivity and high in transparency along with the formation of such a low resistivity film at low temperatures.

There are known a variety of methods of making such transparent conductive films, which can be broadly classified into two groups including a physical film-forming method and a chemical film-forming method. The resistivity of the film depends greatly on the manner of the film formation. Hence, it is important to select a proper method depending on the use of the conductive film.

As set out, for example, in Japanese Laid-open Patent Application No. 2-72549, the ATO film formed according to the physical film-forming method is made at relatively low temperature as having a low resistivity according to a magnetron sputtering technique. On the other hand, according to a chemical film-forming method, there is formed a high strength film with a low resistivity wherein cobalt, nickel or cerium compounds are added to ATO as taught in Japanese Laid-open Patent Application No. 60-220505.

The above-described prior art methods have some problems. With the magnetron sputtering method, the material suffers damages on irradiation of a plasma which is essentially required in the process of the sputtering technique. In addition, it is difficult to appropriately control the compositional ratios in the film, coupled with another disadvantage that a large-scale vacuum apparatus is necessary with a difficulty in coating over a large area.

The film to which cobalt, nickel or cerium compounds are added to ATO as set out in Japanese Laid-open Patent Application No. 60-220505 is based on the concept that the crystallization of the ATO is expedited using the added cobalt, nickel or cerium compound as a firing aid thereby forming a low resistance film. The effect of the above additive is so small that the resistivity is reduced only to an extent of $(1.8–2.0) \times 10^{-2}$ $\Omega.cm$ to $(8.7–9.4) \times 10^{-3}$ $\Omega.cm$. Moreover, an additional thermal treatment at temperatures exceeding 500° C. is undesirably necessary.

SUMMARY OF THE INVENTION

An object of the invention is to provide a material for use as a transparent conductive film which overcomes the above problems and makes use of the advantages of both methods of the prior art, i.e. the material is capable of providing a low resistance film without need of any thermal treatment using high temperatures (exceeding 500° C.) and the material is able for form a film over a large-area device by a simple apparatus, and also to provide a method for making a transparent conductive film using the material.

Other objects of the invention relate to the use of the transparent conductive film with a low resistivity and more particularly, are to provide a liquid crystal display device or a Braun tube having an outer transparent conductive film.

The embodiments of the invention by which the above objects can be achieved are as follows.

(1) A material for use as a transparent conductive film which comprises tin oxide to which antimony is added, an oxide of at least one metal of Group VIII except for Fe, Co and Ni, and an organic solvent.

(2) A method for making a transparent conductive film which comprises the reaction step of conducting hydrolysis and polymerization reaction after dissolution or uniform dispersion, in an organic solvent, of an alkoxide or salt of tin, an alkoxide or salt of antimony, and a salt of a metal of Group VIII except for Fe, Co and Ni, the film-forming step of coating the resultant reaction product on an insulating substrate to form a film thereon, and the firing step of drying and firing the film.

In the above embodiments, the oxides of the transition metals of Group VIII except for Fe, Co and Ni include $Ir_2O_3$, $RuO_2$, $Rh_2O_3$, $PtO$, $PdO$ and $OsO_2$. At least one oxide is added. The metal oxide is preferably added in amounts of not larger than 5 wt %.

The metal oxide is present in the form of fine particles on tin oxide-antimony. The fine particles have preferably a size not larger than 5 nm.

The alkoxides of tin which are a starting material for tin may be ethoxide, propoxide, iso-propoxide, butoxide, iso-butoxide and the like. Tin salts include, for example, chlorides, bromides, iodides and the like, of which $SnCl_4$ is preferred.

Likewise, antimony is used in the form of alkoxides, chloride, bromide, iodide and the like, of which an alkoxide or chloride is preferred.

Fluorides may also be used. In the case, fluorine is added to the tin oxide. When fluorine is added, hydrogen fluoride or organic fluorine compounds may be used.

The organic solvents should be properly selected as dissolving or uniformly dispersing the starting materials used. Usable organic solvents are those which are incapable of reaction thereof with the starting materials for tin and antimony thereby forming any precipitate. Examples of the organic solvents include alcohols, glycols, hexane, cyclohexane and the like solvents.

The metals of Group VIII except for Fe, Co and Ni are added after dissolution in the organic solvent. It is possible to add to the organic solvent after dissolution in water. For this purpose, chlorides, nitrates and ammonium salts can be used.

The transparent conductive film of the invention may be applied as an antistatic film such as on a Braun tube after building up on an insulating film such as of silica. As a starting silica material, there may be used a silica sol solution which is obtained by dissolving an alkoxide of silicon in an organic solvent, to which water or an acid is added. The silica sol solution is preferably prepared by adding ethyl silicate to at least one of ethanol, propanol, iso-propanol, butanol and iso-butanol and further adding nitric acid or hydrochloric acid thereto.

Transparent conductive film of the invention may be one which comprises a built-up layer of a film of an oxide of a metal of Group VIII except for Fe, Co and Ni and a film of tin oxide adding antimony thereto.

The material for transparent conductive film according to the invention is formed as a film by uniformly applying on an insulating substrate by spin coating, spray coating, drawing-up and the like.

The applied film is dried in a thermostatic vessel and fired at a predetermined temperature (preferably from 300°~500° C.). For the firing, known techniques of hot-air blowing, irradiation of infrared rays and the like may be used.

The reaction step wherein the hydrolysis and polymerization reaction are effected is effectively performed by adding water to the solution of the starting materials and agitating at temperatures not higher than 100° C. The reaction temperature is not critical and where alkoxide starting materials are used, no heating is necessary since the hydrolysis rate is high.

The tin oxide-based transparent conductive film material is a kind of n-type semiconductor wherein conduction electrons are produced by addition of tetravalent antimony or fluorine is added to tetravalent tin.

With the n-type semiconductor, if an acceptor level exists in the grain boundary or surface, conduction electrons are trapped with the acceptor level, thereby permitting negative charge. Accordingly, the electron energy increases in the vicinity of the surface or grain boundary, thereby forming a bank layer. The bank layer is so high in potential of the electrons that a gas having high affinity for electron and particularly, oxygen is strongly absorbed. On the absorption of the electron affinity gas, the gas deprives the electrons of the bulk, resulting in an anion. This makes a higher bank layer at the surface and grain boundary, eventually leading to the increase of the resistivity.

In the practice of the invention, the particles of the oxide of the metal of Group VIII are dispersed on or in the material for transparent conductive material mainly composed of tin oxide. The oxide of the metal of Group VIII having a great electronegativity serves to keep the bank layer low at the surface and grain boundary, thereby maintaining a low resistivity.

The electrons and holes produced in the semiconductor are recombined or trapped with the absorbed gas and disappear. However, when existing in the vicinity of the surface and grain boundary, the oxide of the metal of Group VIII attracts the holes thereby not only permitting charge separation, but also causing the absorbed, anionized, electron affinity gas and the holes to be combined together. This makes it possible to desorb the once absorbed gas so that the bank layer at the surface and grain boundary is kept low. More particularly, the particles of the metal of Group VIII on the tin oxide act as a microelectrode.

If the film thickness is relatively small, similar effects will be produced by building up fine particles of the metal oxide of Group VIII.

When a low resistance material such as ruthenium is selectively used among the oxides of metals of Group VIII but in excess, the resistance of ruthenium adversely influences, resulting in a great resistivity. If used in further larger amounts, the fine particles are dispersed on the transparent conductive film material as having a large particle size. This in turn renders the surface area of the metal oxide smaller, resulting in a reduced number of active sites which act to react with the absorbed oxygen. Accordingly, it is necessary to appropriately control the amount of the oxide of the metal of Group VIII.

BRIEF DESCRIPTION OF THE DRAWINGS

The above and other objects, features and advantages of the present invention will be more apparent from the following description, referring to the accompanying drawings in which.

DETAILED DESCRIPTION OF THE PREFERRED EMBODIMENTS

The invention is more particularly described by way of examples.

Example 1

Figure 1:
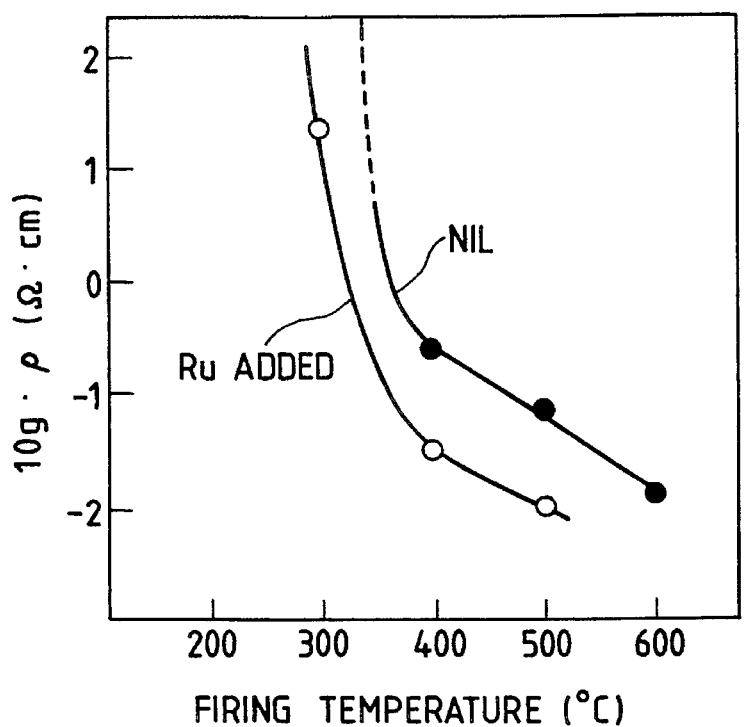
FIG. 1 is a graph showing the relation between the firing temperature and the resistivity of a ruthenium-added tin oxide film and a ruthenium-free tin oxide film.

Tin chloride was dissolved in propanol, to which isopropoxy antimony was further added, followed by agitation under heating conditions at 80° C. for 2 hours to provide a starting solution. Separately, the above procedure was repeated using ruthenium acetylacetate, followed by agitation under heating conditions at 80° C. for 2 hours to obtain another starting solution. The solutions were, respectively, spin coated onto a glass substrate at 2000 r.p.m., followed by firing at 300°~500°C., thereby obtaining a tin oxide thin film to which 10 wt % of Sb was added and a tin oxide thin film to which 10 wt % of Sb and 1 wt % of $RuO_2$ were added. The relation between the firing temperature and the resistivity at room temperature for these films is shown in FIG. 1.

The film to which Ru was added has a resistivity which is smaller by about one order of magnitude than that of the Ru-free film. The measurement of UV and visible light absorption spectra of the films reveals that all the films exhibited a transmittance not less than 95% in the visible light range.

Example 2

Figure 2:
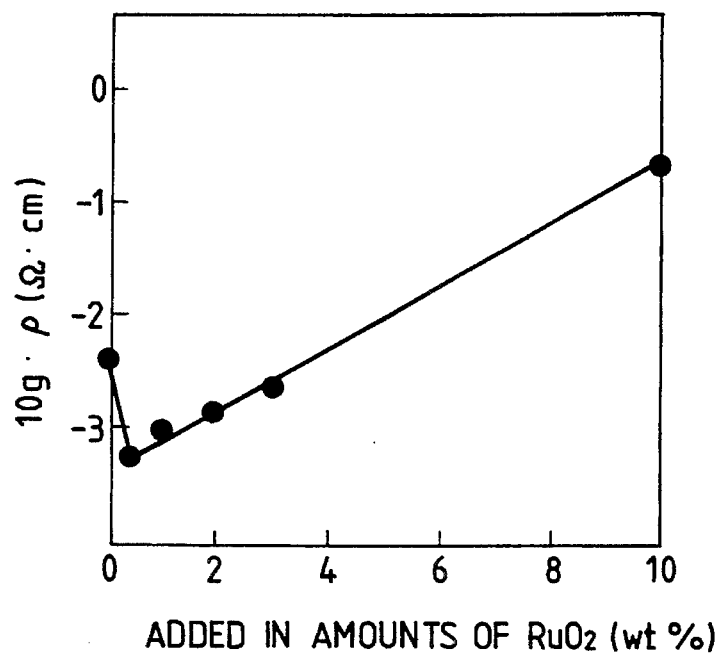
FIG. 2 is a graph showing the relation between the amount of ruthenium oxide and the resistivity of the tin oxide film.

In the starting solution of Example 1, the amount of Ru was changed, with the their resistivity being shown in FIG. 2.

In the amounts not larger than 5 wt %, the resistivity can be made smaller than that of the Ru-free film. However, when the amount exceeds 5 wt %, larger resistivities result.

Figure 3:
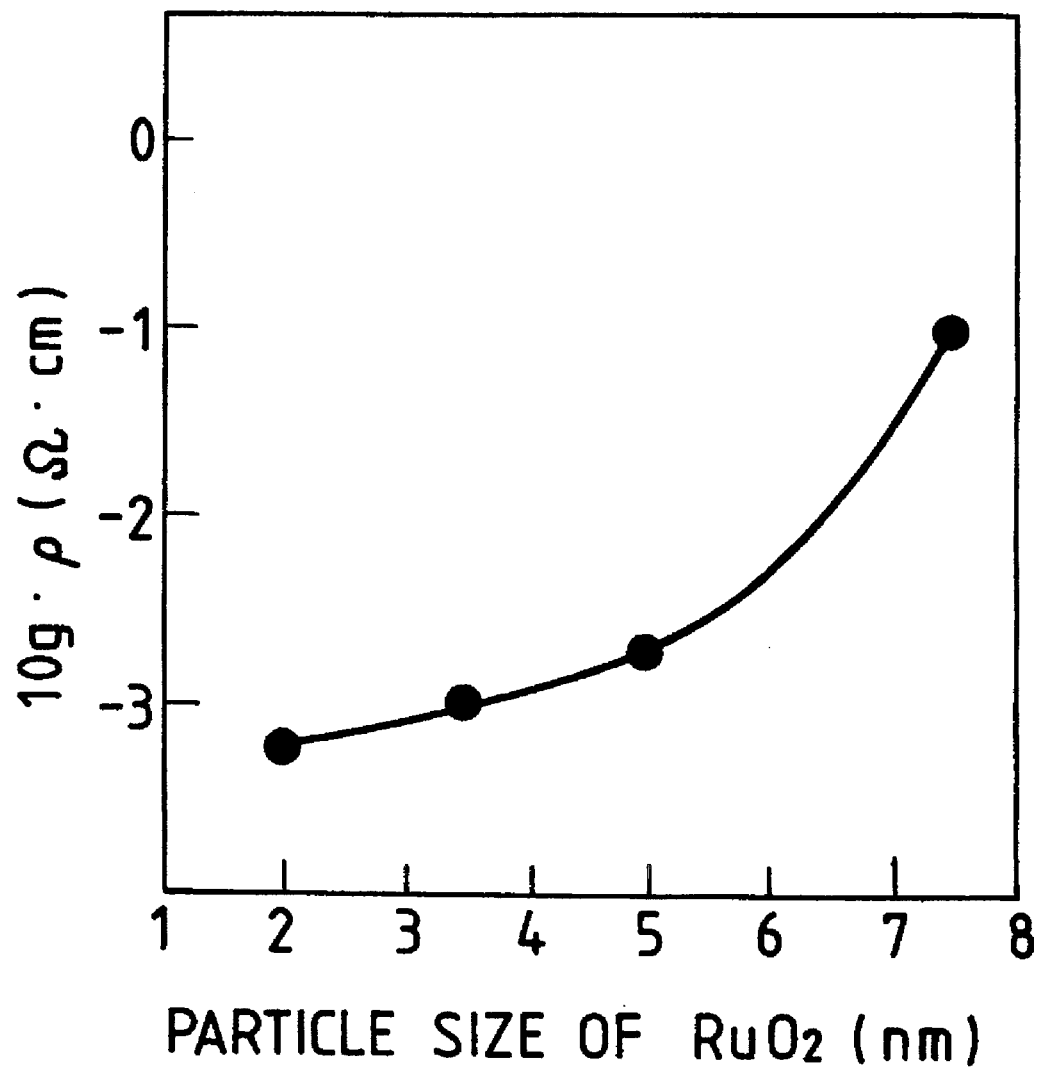
FIG. 3 is a graph showing the relation between the particle size of ruthenium oxide and the resistivity of the tin oxide film.

The observation of the films through TEM reveals that the fine particles of ruthenium oxide are formed as crystals. The size of the ruthenium oxide fine particles increases with an increasing amount of Ru. The relation between the particle size of Ru and the resistivity is shown in FIG. 3. A smaller size results in a smaller resistivity. If the particle size of Ru increases, the resistivity of ruthenium oxide influences the resistivity of the conductive film. In this sense, the particle size should preferably be not larger than 5 nm.

A transparent conductive film made of a tin oxide thin film to which 10 wt % of antimony and 0.2 wt % of ruthenium oxide were added was formed on a substrate of a liquid crystal display device.

This transparent conductive film can be formed by a simple coating procedure. Thus, a liquid crystal display device having good film characteristics can be fabricated at

Example 3

Ruthenium acetylacetate was dissolved in ethanol and spin coated onto a glass substrate at 200 r.p.m., followed by drying and firing at 500° C. to form a ruthenium oxide film. A solution of tin chloride and iso-propoxy antimony in propanol was likewise spin coated onto the ruthenium oxide film thereby forming a builtup film of ruthenium oxide-ATO (10 wt % of Sb). The resistivity of the film at room temperature was measured, revealing that it was about the half of that of the ATO single phase film.

Example 4

The starting solution of Example 2 containing 10 wt % of antimony and 0.2 wt % of ruthenium oxide was spin coated onto a display panel surface of a Braun tube to form a transparent conductive film. A propanol solution of ethyl silicate was further spray coated to form a silica layer, thereby obtaining the Braun tube having the silica layer/transparent conductive film.

The builtup film had a reflectance of 0.1~ 0.3% at 560 nm and a resistance of $7.6 \times 10^3$ $\Omega/cm^2$. Thus, it was possible to make a Braun tube having a high performance antistatic film thereon.

Example 5

Tin chloride and iso-butoxy antimony were, separately, dissolved in propanol, and the propanol solution of iso-propoxy antimony was added to the tin chloride solution so that the concentration of tin was 0.3 moles/l and a molar ratio between tin and antimony of 100:10, thereby preparing a solution for ATO film.

Cobalt nitrate, nickel nitrate, iron nitrate, rhodium nitrate, iridium nitrate, palladium chloride, and ruthenium chloride were, respectively, added to the starting solution, followed by agitation under heating at 80° C. for 10 hours to obtain starting coating solutions for ATO film to which the metal oxides were added, respectively.

The respective coating solutions were spin coated onto a quartz substrate at 1000 r.p.m. for 60 seconds, followed by drying at 60° C. for 20 minutes and firing in air at 400° C. for 20 minutes, to form ATO films. The thus formed films were subjected to measurements of the resistance and film strength determined by an eraser test. The eraser test was conducted by a procedure wherein each film was rubbed with an eraser under a load of 1 kg and subjected to measurement of a resistance, followed by repetition of the rubbing and measuring steps until the resistance was varied. The test was evaluated as the number of the repetition of the rubbing. The results are shown in Table 1.

TABLE 1

| Sample | Additive | Resistance ($\Omega/cm^2$) | Eraser Test |
| --- | --- | --- | --- |
| 1 | NiO | $5.6 \times 10^4$ | over 200 cycles |
| 2 | $Fe_2O_3$ | $5.2 \times 10^4$ | " |
| 3 | CoO | $3.2 \times 10^4$ | " |
| 4 | $RuO_2$ | $3.0 \times 10^3$ | " |
| 5 | $Rh_2O_3$ | $5.8 \times 10^3$ | " |
| 6 | PdO | $6.8 \times 10^3$ | " |
| 7 | PtO | $6.4 \times 10^3$ | " |
| 8 | $Ir_2O_3$ | $4.8 \times 10^3$ | " |
| 9 | OsO | $6.2 \times 10^3$ | " |
| 10 | nil | $8.5 \times 10^4$ | " |

When cobalt or nickel is added, the resistance of the ATO film is only slightly reduced. On the contrary, when ruthenium, rhodium, or platinum is added, the resistance of the ATO film is reduced to about 1/10.

With respect to the film strength, all the films undergo any change in the resistance over 200 cycles and are satisfactory as an antistatic film. In addition, any reduction treatment such as with hydrogen is not necessary after the fabrication of the film.

From the foregoing results, it will be seen that the addition of the oxide of the metal of Group VIII except for Co, Ni and Fe results in a transparent conductive film having a low resistance.

According to the invention, surface absorption species such as oxygen can be eliminated by addition of the oxide of the metal of Group VIII except for Co, Ni and Fe, so that the resistivity of the resulting tin oxide film can be smaller by one order of magnitude or over than those of known materials. This ensures easy formation of a transparent conductive film with a large area.

The transparent conductive film of the invention has good characteristics as a transparent electrode for liquid crystal display devices and an antistatic film on a display surface of Braun tubes.

What is claimed is:

1. A low resistance, transparent conductive film comprising tin oxide to which antimony is added to form a film, and not more than about 2 wt. % of fine particles of at least one oxide of a Group VIII metal except for Fe, Co and Ni on the tin oxide-antimony film, the fine particles having a particle size of not greater than 5 nm.

* * * * *